(12) United States Patent
Buckl et al.

(10) Patent No.: US 8,724,510 B2
(45) Date of Patent: May 13, 2014

(54) METHOD AND DEVICE FOR PLACING UNITS FOR EXECUTING AN APPLICATION IN A DISTRIBUTED SYSTEM

(75) Inventors: Christian Buckl, Wangen (DE); Jörg Heuer, Oberhaching (DE); Anton Schmitt, Vaterstetten (DE); Andreas Scholz, Unterschleißheim (DE); Martin Winter, Rosenheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/320,333

(22) PCT Filed: Mar. 26, 2010

(86) PCT No.: PCT/EP2010/053992
§ 371 (c)(1),
(2), (4) Date: Dec. 29, 2011

(87) PCT Pub. No.: WO2010/130503
PCT Pub. Date: Nov. 18, 2010

(65) Prior Publication Data
US 2012/0099477 A1   Apr. 26, 2012

(30) Foreign Application Priority Data

May 12, 2009  (DE) .......................... 10 2009 021 007

(51) Int. Cl.
*H04L 12/28*      (2006.01)
(52) U.S. Cl.
USPC ....................................................... 370/254
(58) Field of Classification Search
None
See application file for complete search history.

(56) References Cited

U.S. PATENT DOCUMENTS

| 6,801,528 | B2 | 10/2004 | Nassar ........................... 370/389 |
| 6,909,899 | B2 | 6/2005 | Wang et al. .................... 455/436 |
| 7,574,524 | B2 | 8/2009 | Bantz et al. .................... 709/238 |

(Continued)

FOREIGN PATENT DOCUMENTS

| CN | 1604532 A | 4/2005 | ............ G06F 15/173 |
| CN | 1679302 A | 10/2005 | .............. H04L 29/06 |

(Continued)

OTHER PUBLICATIONS

Machado, et al., "Integration of Embedded Devices through Web Services: Requirements, Challenges and Early Results", Proceedings of the 11$^{th}$ IEEE Symposium on Computers and Communications, pp. 353-358, Jun. 26, 2006.

(Continued)

*Primary Examiner* — Gregory Sefcheck
*Assistant Examiner* — Suk Jin Kang
(74) *Attorney, Agent, or Firm* — King & Spalding L.L.P.

(57) ABSTRACT

In a method and a device for placing units, such as motes, for executing an application in a distributed system, a placement of the units by a service layer and a communication between the units by a communication layer are provided. One field of application is for example process automation, such as in industrial or building management installations. Such installations have sensors and actuators with communication interfaces. The method and the device allow the energy demand of the installation to be reduced. Communication is preferably performed wirelessly. Network management is for example conducted according to the wireless HART protocol.

10 Claims, 3 Drawing Sheets

(56) References Cited

U.S. PATENT DOCUMENTS

| | | | |
|---|---|---|---|
| 7,580,704 B2 | 8/2009 | Narita | 455/416 |
| 2005/0080811 A1* | 4/2005 | Speeter et al. | 707/102 |
| 2006/0161895 A1* | 7/2006 | Speeter et al. | 717/121 |
| 2006/0179116 A1* | 8/2006 | Speeter et al. | 709/217 |
| 2007/0233881 A1 | 10/2007 | Nochta et al. | 709/228 |
| 2008/0033785 A1 | 2/2008 | Anke | 705/10 |
| 2008/0279155 A1 | 11/2008 | Pratt, Jr. et al. | 370/336 |
| 2009/0010204 A1* | 1/2009 | Pratt et al. | 370/328 |
| 2009/0010205 A1* | 1/2009 | Pratt et al. | 370/328 |
| 2009/0046675 A1* | 2/2009 | Pratt et al. | 370/337 |
| 2009/0046732 A1* | 2/2009 | Pratt et al. | 370/406 |
| 2009/0052429 A1* | 2/2009 | Pratt et al. | 370/350 |
| 2009/0059814 A1 | 3/2009 | Nixon et al. | 370/254 |
| 2011/0178611 A1* | 7/2011 | Daraiseh et al. | 700/80 |
| 2011/0216656 A1* | 9/2011 | Pratt et al. | 370/241 |
| 2011/0302635 A1* | 12/2011 | Pratt et al. | 726/4 |
| 2012/0124554 A1 | 5/2012 | Tam | 717/121 |

FOREIGN PATENT DOCUMENTS

| | | | | |
|---|---|---|---|---|
| CN | 1829155 A | 9/2006 | | H04L 12/00 |
| CN | 101136877 A | 3/2008 | | H04L 12/58 |
| EP | 1892656 A1 | 2/2008 | | G06Q 10/00 |

OTHER PUBLICATIONS

Moreira Sa de Souza, et al., "Socrades: A Web Service Based Shop Floor Integration Infrastructure", The Internet of Things—Lecture Notes in Computer Science; Springer Berlin Heidelberg XP019087711, pp. 50-67, Mar. 26, 2008.

Lombriser, et al., "Modeling Service-Oriented Context Processing in Dynamic Body Area Networks", IEEE Journal on Selected Areas in Communications, vol. 27, No. 1; pp. 49-57, Jan. 1, 2009.

Candido, et al., "SOA in Reconfigurable Supply Chains: A Research Roadmap", Engineering Applications of Artificial Intellectual, vol. 22, No. 6; pp. 939-949, Jan. 30, 2009.

Evensen, et al., "Sensor Virtualization with Self-Configuration and Flexible Interactions", ACM International Conference Proceedings Series—The $3^{rd}$ ACM International Workshop on Context-Awareness for Self-Managing System, 2009 Association for Computing Machinery USA; XP002602223; pp. 31-38, May 11, 2009.

International PCT Search Report and Written Opeinion, PCT/EP2010/055816, 13 pages, Oct. 14, 2010.

Kim, et al., "When HART Goes Wireless: Understanding and Implementing the WirelessHART Standard", Emerging Technologies and Factory Automation, IEEE Int'l Conference ON, IEEE Piscataway, NJ; pp. 899-907, Sep. 15, 2008.

Rezgui et al., "Service-Oriented Sensor-Actuator Networks: Promises, Challenges, and the Road Ahead", Science Direct, Computer Communications; pp. 2627-2648, Jun. 26, 2007.

Sanchez, et al., "Bandwidth-Efficient Geographic Multicast Routing Protocol for Wireless Sensor Networks", Sensors Journal, IEEE, vol. 7, issue 5; pp. 627-636, May 2007.

Wang, et al., "Service Composition in Service-Oriented Wireless Sensor Networks with Persistent Queries", Consumer Communications and Networking Conference, CCNC.$6^{th}$ IEEE, 5 pages, Jan. 15, 2010.

International Search Report and Written Opinion, PCT/EP2010/053992, 18 pages, Aug. 31, 2010.

German Office Action, German Patent Application No. 10 2009 021 007 5-31, 5 pages, Jan. 15, 2010.

Chinese Office Action, Application No. 201080020780.6, 6 pages, Oct. 10, 2013.

* cited by examiner

METHOD AND DEVICE FOR PLACING UNITS FOR EXECUTING AN APPLICATION IN A DISTRIBUTED SYSTEM

CROSS-REFERENCE TO RELATED APPLICATIONS

This application is a U.S. National Stage Application of International Application No. PCT/EP2010/053992 filed Mar. 26, 2010, which designates the United States of America, and claims priority to German Application No. 10 2009 021 007.5 filed May 12, 2009. The contents of which are hereby incorporated by reference in their entirety.

TECHNICAL FIELD

The invention relates to a method and a device for placing units for executing an application in a distributed system.

BACKGROUND

In process automation, such as for example in industrial installations or building management installations, units are increasingly used as sensors and actuators with communication interfaces which are distributed in a building. Said sensors and actuators may be incorporated into a wireless network. Moreover, they may be operated by means of a battery, i.e. as standalone devices.

When implementing an application by means of said units, the application may be distributed over two or more units.

SUMMARY

According to various embodiments, a method and a device can be provided by which an application may be implemented by means of a plurality of units in an energy-efficient manner.

According to an embodiment, a method for placing units for executing an application in a distributed system, the application being able to be divided into at least two sub-applications and the units being able to communicate at least partially with one another via a network with communication connections, may comprise the following steps: assigning the respective sub-application to one of the respective first units of the units, such that (a) the respective first unit is able to execute the assigned sub-application, and (b) a number of units is reduced to the communication connections for connecting the first units; determining the respective connection parameters for the respective communication connections; determining the communication connections for connecting two of the first units; and configuring the network according to the determination of the communication connections.

According to a further embodiment, when assigning the respective sub-application it can be further ensured that the respective connection parameter of one of the communication connections for connecting two of the first units implements at least one respective requirement for exchanging information between the sub-applications assigned to two of the first units. According to a further embodiment, at least one of the communication connections which is not used for exchanging information between two of the first units can be deactivated. According to a further embodiment, information which has to be transmitted from one of the first units to two of the first units, can be transmitted at least via a partial connection to one of the units by means of a single message and is then forwarded as two separate messages for transmitting to two of the first units. According to a further embodiment, the assignment of the respective sub-application and the determination of the communication connections through a service layer and the determination of the respective connection parameters and the configuration of the network through a communication layer can be executed by exchanging information.

According to another embodiment, a device for placing units for executing an application in a distributed system, the application being able to be divided into at least two sub-applications and the units being able to communicate at least partially with one another via a network with communication connections, may comprise: first means for assigning the respective sub-application to one of the respective first units of the units, such that (a) the respective first unit is able to execute the assigned sub-application and (b) a number of units may be reduced to the communication connections for connecting the first units; second means for determining respective connection parameters for the respective communication connections; third means for determining the communication connections for connecting two of the first units; fourth means for configuring the network according to the determination of the communication connections.

According to a further embodiment of the device, the first means can be further designed such that when assigning the respective sub-application it may further be ensured that the respective connection parameter of one of the communication connections for connecting two of the first units implements at least one respective requirement for exchanging information between the sub-applications assigned to two of the first units. According to a further embodiment of the device, the fourth means can be further designed such that at least one of the communication connections which is not used for exchanging information between two of the first units may be deactivated. According to a further embodiment of the device, the device further may comprise a fifth means which is designed such that information which is to be transmitted from one of the first units to two of the first units, may be transmitted at least via a partial connection to one of the units by means of a single message and then may be forwarded as two separate messages for transmitting to two of the first units. According to a further embodiment of the device, the assignment of the respective sub-application and the determination of the communication connections through a service layer and the determination of the respective communication parameters and the configuration of the network through a communication layer may be executed for exchanging information.

BRIEF DESCRIPTION OF THE DRAWINGS

Various embodiments are described in more detail with reference to the figures, in which.

DETAILED DESCRIPTION

Figure 1:
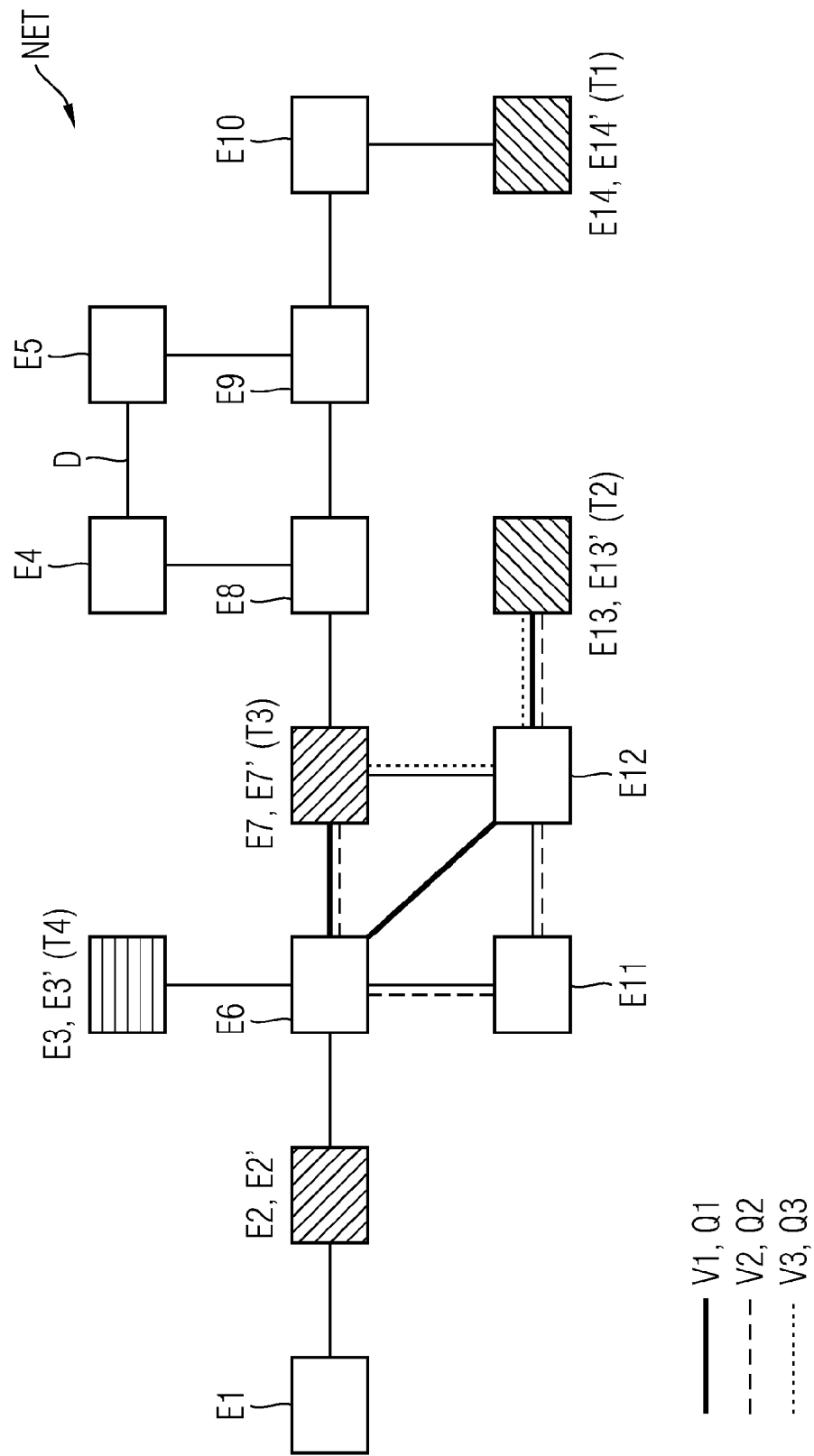
FIG. 1 shows units in a network before executing the method for placing.

As stated above, according to various embodiments, in a method for placing units for executing an application in a distributed system, the application being able to be divided into at least two sub-applications and the units being able to communicate at least partially with one another via a network with communication connections, the following steps can be carried out:

assigning the respective sub-application to one of the respective first units, the first units being selected from the units, such that (a) the respective first unit is able to execute the assigned sub-application, (b) a number of units is reduced to the communication connections for connecting the first units;

determining the respective connection parameters for the respective communication connections;

determining the communication connections for connecting two of the first units;

configuring the network according to the determination of the communication connections.

The method has the advantage of saving energy when executing the application in the distributed system by the application being implemented by a series of services, in that said services, which are implemented on units, are able to be placed between the units according to existing communication connections. Conversely, communication relationships between the units may be used to configure the communication according to the requirements of the application. The method in this case permits a reduction in the energy requirement when executing the application as the respective communication connections are kept short by placing the first units in close proximity.

In a development of the method, when assigning the respective sub-application it is further ensured that the respective connection parameter of one of the communication connections for connecting two of the first units implements at least one respective requirement for exchanging information between the sub-applications assigned to two of the first units.

Thus it is ensured that not only short communication connections are achieved between the first units but also those partial connections are selected which fulfill the respective requirement of the two first units to be connected.

In an optional development, at least one of the communication connections which is not used for exchanging information between two of the first units is deactivated. By the deactivation of unused units a further reduction in energy is achieved during operation of the distributed system.

Advantageously, information which has to be transmitted from one of the first units to two of the first units, is transmitted at least via a partial connection to one of the units by means of a single message and is then forwarded as two separate messages for transmitting to two of the first units. By combining the messages on the same partial connection of the communication connection, a reduction of the number of messages to be transmitted is achieved. As a result, an end-to-end transmission time and the energy requirement for operation of the application in the distributed system may be further reduced.

In a further optional development, the assignment of the respective sub-application and the determination of the communication connections through a service layer and the determination of the respective connection parameters and the configuration of the network through a communication layer are executed by exchanging information.

The use of the service layer and the communication layer which, for creating the application in the distributed system, exchange information in both directions, permits optimized placement of the units, as the placement of the units is matched to the available communication infrastructure. In contrast thereto, a structure in which the service layer is executed independently of the communication layer would not lead to optimal placement, as a stepwise matching of all the layers is not possible.

According to other embodiments, a device for placing units for executing an application in a distributed system, the application being able to be divided into at least two sub-applications and the units being able to communicate at least partially with one another via a network with communication connections, may comprise:

first means (M1) for assigning the respective sub-application to one of the respective first units of the units, such that (a) the respective first unit is able to execute the assigned sub-application, (b) a number of units may be reduced to the communication connections for connecting the first units;

second means for determining the respective connection parameters for the respective communication connections;

third means for determining the communication connections for connecting two of the first units;

fourth means for configuring the network according to the determination of the communication connections.

Preferably, the first means of the device is further designed such that when assigning the respective sub-application it may further be ensured that the respective connection parameter of one of the communication connections for connecting two of the first units implements at least one respective requirement for exchanging information between the sub-applications assigned to two of the first units.

In an optional development of the device, the fourth means is further designed such that at least one of the communication connections which is not used for exchanging information between two of the first units may be deactivated.

Alternatively or additionally, the device further comprises a fifth means which is designed such that information which is to be transmitted from one of the first units to two of the first units, may be transmitted at least via a partial connection to one of the units by means of a single message and then may be forwarded as two separate messages for transmitting to two of the first units.

Preferably, the device is designed such that the assignment of the respective sub-application and the determination of the communication connections through a service layer and the determination of respective connection parameters and the configuration of the network through a communication layer (NLY) may be executed for exchanging information.

The device and the developments thereof exhibit the same advantages as the method steps corresponding thereto.

Elements with the same function and the same mode of operation are provided in the figures with the same reference numerals.

FIG. 1 shows by way of example a network NET with fourteen units E1, . . . , E14. Said units form part of a sensor network, the units being standalone devices and exchanging information wirelessly by means of a communication interface, for example based on a ZigBee standard. The units may transmit information at least partially via communication connections V1, V2, V3 existing between two units. Thus the unit E13 may communicate with the unit E7 via the following three end-to-end paths which in each case represent one of the communication connections:

V1: E13-E12-E6-E7
V2: E13-E12-E11-E6-E7
V3: E13-E12-E7

Said communication connections differ in their QoS (QoS—Quality of Service) which, for example, includes bandwidth, transmission delay, transmission power, residual error rate, etc. Thus the three communication connections exhibit the following QoS, which are denoted as the connection parameters Q1, Q2, Q3:

Q1 for V1: delay: 5 seconds, bandwidth 2 kbit/s
Q2 for V2: delay: 10 seconds, bandwidth 10 kbit/s
Q3 for V3: delay: 20 seconds, bandwidth 50 kbit/s Some of the units may undertake specific tasks:
units E13 and E14, see hatching from bottom left to top right, detect temperature values;
units E2 and E7, see hatching from top left to bottom right, may undertake simple calculating operations;
unit E3 may provide and/or display measured values.

By means of at least some of the units, the application is intended to be implemented such that two of the units in each case determine a temperature, a further unit processes the two temperature values to form an average value and the average value is delivered to the unit E3. This application may be divided into the following sub-applications T1, T2, T3, T4 which in each case are denoted as a service:

T1: temperature measurement 1
T2: temperature measurement 2
T3: average value detection
T4: provision of the average value The following steps are carried out for executing the application.

In one step S1, the connection parameters Q1, Q2, Q3 for connections of the units are determined. In a development of the method, only the connection parameters are determined which respectively describe a connection between two units, which may carry out at least one respective sub-application.

In a subsequent step S2, the respective sub-applications are assigned to the respective first units from the total number of all units present, with the following conditions:

(a) only the unit which is able to execute the sub-application may be assigned to the sub-application. In FIG. 1, only the units E13 and E14 may carry out temperature measurements so that the sub-applications T1 and T2 are assigned thereto. Moreover, only the units E2 and E7 are able to complete the sub-application T3. By means of the next condition (b) a selection is then made which takes over this sub-application T3 from the units E2, E7. The sub-application T4 may only be carried out by the unit E3, see horizontal lines as hatching.

(b) a number of units located between the first units to be determined may be reduced. This means that if a plurality of communication connections are available for connecting two first units, the one which passes through a minimum number of further units has to be used. However, when applying this condition it has to be taken into account that, as a communication connection between two first units, the communication connection has to be selected which also ensures the requirement of the respective sub-application for the exchange of information.

This is explained in more detail in the example of the three communication connections V1, V2, V3. The sub-application T1 which is executed on the first unit E13 requires 0.2 kbit/s of bandwidth and a maximum delay of 12 seconds. Although the connection V3 only passes over 1 unit, whereas the connection V2 passes over 3 units and V1 passes over 2 units, the connection parameters Q3 of the connection V3 do not fulfill the requirements of the sub-application T1. Thus the connection V3 is not selected. The connections V1 and V2 fulfill the requirements of the sub-application T1, the connection V1 being selected as said connection passes through the fewest units.

The following two sets of first units are possible:
SET1: E14 for T1, E13 for T2, E2 for T3, E3 for T4
SET2: E14 for T1, E13 for T2, E7 for T3, E3 for T4.

In SET1, temperature values of the unit E14 are delivered to E2 via E14-E10-E9-E8-E7-E6-E2 and of the unit E13 via E13-E12-E6-E2 and the average value is then delivered via E2-E6-E3 to E3. Thus 8 units are passed through in SET1.

In SET2, temperature values of the unit E14 are delivered to E7 via E14-E10-E9-E8-E7 and of the unit E13 via E13-E12-E6-E7 and the average value is then supplied to E3 via E2-E6-E3. Thus 6 units are passed through in SET2. As the communication connections of fewer units are passed through in SET2, E14=E14', E7=E7, E13=E13' and E3=E3' are consequently selected as first units. Some of the remaining units of the network only serve to transmit information.

Figure 2:
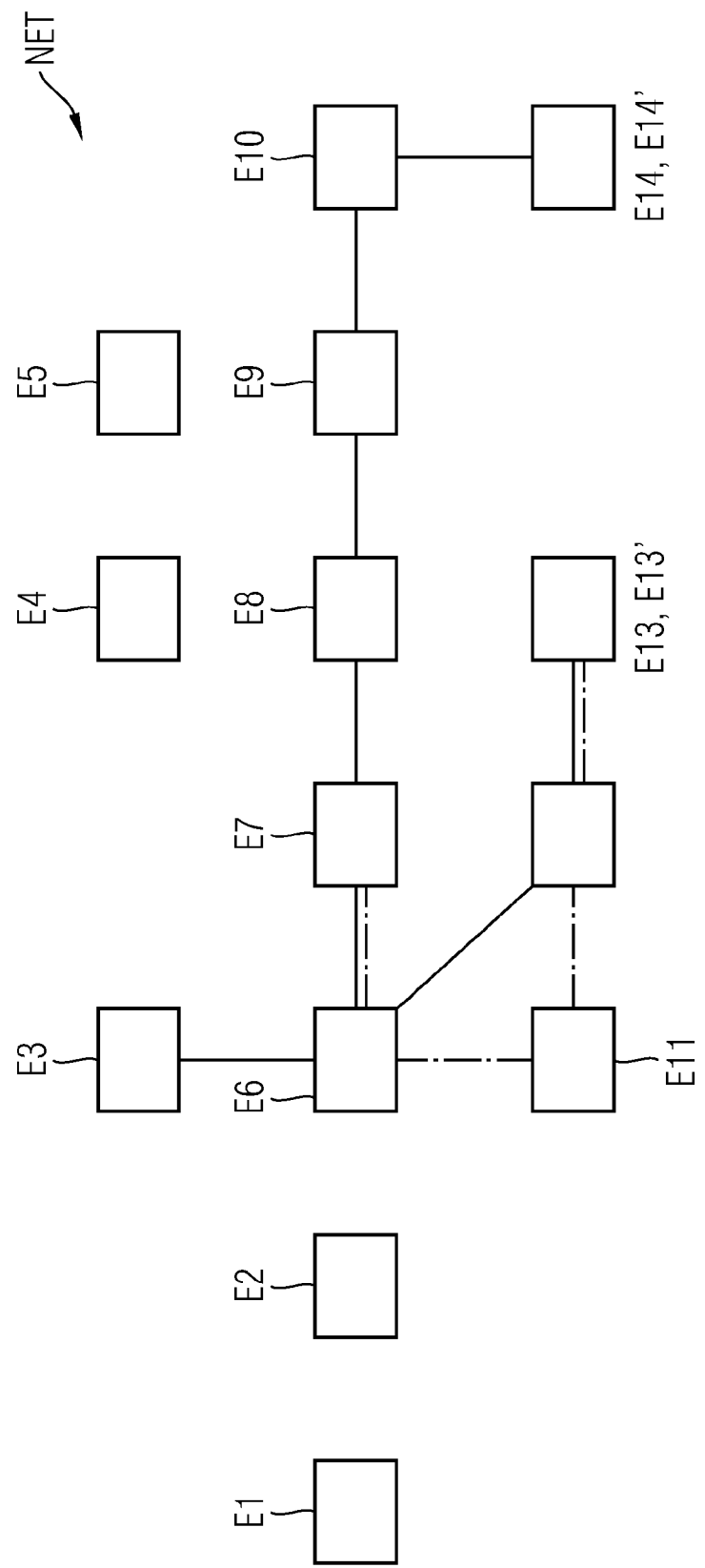
FIG. 2 shows the placement of the units for executing an application in a distributed system and the associated communication connections.

In a further step S3, based on the determined first units and the associated communication connections, the network is optimized such that unnecessary connections and/or partial connections are deactivated. To this end, it is communicated to the units (i) which connections are not required and (ii) how essential connections are to be configured. Thus the connection E8-E4 is deactivated and the connection E13-E12-E6-E7 throttled on request of the sub-application T1. The result of the measures (i) and (ii) is that energy consumption for the transmission of information in the distributed system is reduced. FIG. 2 shows the network NET after completion of the method. Thus the partial connections, identified by a solid line, between in each case two units, show partial connections of the communication connections used for the application. Additionally, replacement partial connections may be configured, marked by dotted-dashed lines, which in the case of a failure of communication connections or parts thereof may replace said communication connections.

Figure 3:
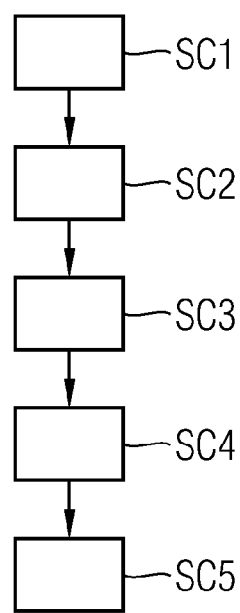
FIG. 3 shows method steps of a further exemplary embodiment.
Figure 5:
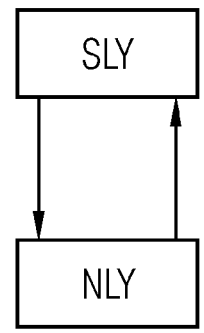
FIG. 5 shows the service layer and communication layer which implement the further exemplary embodiment.

Nowadays, it is common to describe communication relationships between the units by means of an OSI—model (OSI—Open Systems Interconnection). In this case, the communication is shown in a plurality of superimposed layers. For carrying out the present method the hierarchical structure of this layer model is broken by a communication being able to be carried out directly between the following layers: the service layer and the communication layer. In this example, the communication layer corresponds to the OSI layers 1-3. The service layer is located in the OSI layer 7. The communication takes place directly between the service layer and the communication layer, bypassing the OSI layers 4 to 6. This is to be described in more detail with reference to FIG. 3, FIG. 5 showing by way of example an information exchange between the service layer SLY and the communication layer NLY.

Step SC1:

The network topology of the network NET is communicated to the service layer, for example by the communication layer. The application is formed by the units on which the different services T1, T2, T3, T4, i.e. sub-applications, are implemented, the units forming the embedded network. In this case, the application is formed by a group of services. In the embedded network with service-oriented architecture, at least some of the services, which for example produce logical links between measured values, are placed on different motes (Motes—term for the units if they are wireless sensor nodes with an option to execute at least one service). Due to the network topology, the service layer may arrange the motes and thus the services such that the communication paths, i.e. the communication connections, are selected to be as short as possible. Thus energy for the wireless transmission of data, such as measured values, may be reduced. Additionally, redundancy requirements of the service layer, such as for example multiple connections for guaranteed data transmission, have to be considered.

Step SC2:

In a next step, the service layer transmits a service-routing to the communication layer. The service-routing indicates which units exchange information with one another in order to implement the application. Thus the service-routing indicates the first units which in this example are implemented as motes. Using the service-routing information, the communication layer is able to identify the communication requirements of the motes, such as for example which partial connections between the motes are not required.

Step SC3:

In this step, the edges of the network topology i.e. the partial connections of the respective communication connections are described by communication-specific QoS parameters such as transmission power, bandwidth, delay, etc. and communicated to the service layer. Using this information, the service layer selects the partial connections which fulfill the respective QoS conditions for connecting two respective first units. For example, the selected partial connection fulfills a real time condition or is particularly reliable relative to transmission quality.

Step SC4:

In step SC4, the service layer transmits the QoS requirement for implementing the application to the communication layer which configures the communication infrastructure, i.e. the routing of the network, according to the QoS requirements, for example by means of a net manager component as is defined in the wireless HART standard.

Step SC5:

For the exchange of information between the services of the application, messages in the communication layer which use a suitable communication relationship which, for example, use a common transmitter-receiver relationship, broadcast or multicast, are set up so that said messages are combined in one message and if necessary only transmitted once. Moreover, messages may also be combined on one sub-path and then again divided into separate messages. As a result, it is achieved that the messages may be transmitted exceptionally efficiently and as a result transmission power may be saved. Moreover, messages such as the keep-alive message, may be extended so that they can transport additional information of the service layer.

Figure 4:
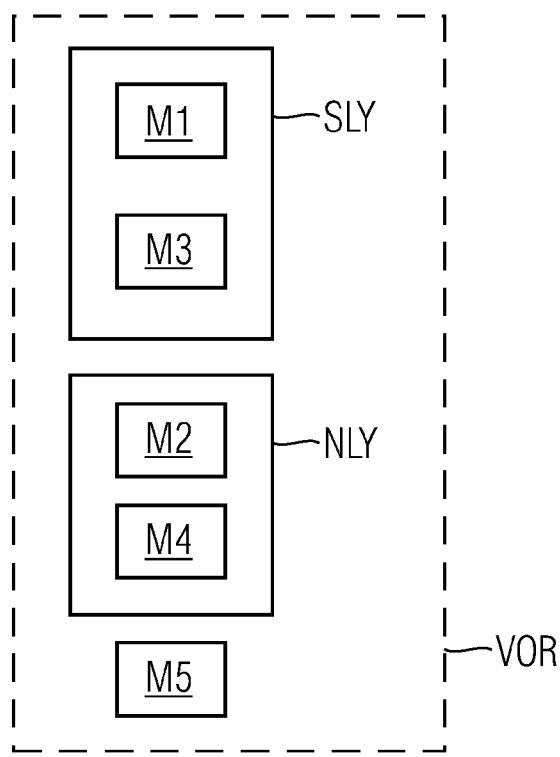
FIG. 4 shows a device for executing the method by a plurality of means.

FIG. 4 shows a device VOR for placing units E1, ..., E14 for executing an application in a distributed system, the application being able to be divided into at least two services and the units being able to communicate with one another at least partially via a network NET with communication connections V1, V2, V3, comprising the following means:

first means M1 for assigning the respective services, i.e. sub-applications, to the respective first units from the total number of all units present such that (a) the respective first unit may execute the assigned service, (b) a number of units may be reduced to the communication connections for connecting the first units;

second means for determining the respective connection parameters for the respective units;

third means M3 for determining the communication connections for connecting two of the first units;

fourth means M4 for configuring the network NET according to the determination of the communication connections V1.

The device further comprises a fifth means M5 which is designed so that information which has to be transmitted from one of the first units to two of the first units may be transmitted at least via a partial connection to one of the units by means of a single message and then may be forwarded as two separate messages for transmitting to two of the first units.

The first and third means may be implemented by means of the service layer SLY and the second and fourth means may be implemented by means of the communication layer.

The units, the service layer and the communication layer may be implemented and executed in software, hardware or in a combination consisting of software and hardware, such as for example by one respective computer. One field of application of the various embodiments is, for example, process automation such as in industrial installations or in building management installations.

The invention claimed is:

1. A method for distributing an application in a distributed system having a plurality of units, the application comprising multiple sub-applications and the plurality of units being configured to communicate at least partially with one another via a network with communication connections, the method comprising the following steps:

determining connection parameters for communication connections between the units;

for each sub-application, identifying from the plurality of units at least one first unit configured to execute that sub-application;

identifying multiple different assignment configurations for assigning the sub-applications to selected first units configured to execute the respective sub-applications;

for each of the multiple assignment configurations:

identifying a set of communication connections between the selected first units that have connection parameters that meet connection requirements defined by one or more of the sub-applications; and determining a number of units located along the identified set of communication connections;

selecting the assignment configuration having the smallest determined number of units located along the respective set of communication connections; and configuring the network according to the selected assignment configuration.

2. The method according to claim 1, wherein when assigning the respective sub-application it is further ensured that the respective connection parameter of one of the communication connections for connecting two of the first units implements at least one respective requirement for exchanging information between the sub-applications assigned to two of the first units.

3. The method according to claim 1, wherein at least one of the communication connections which is not used for exchanging information between two of the first units is deactivated.

4. The method according to claim 1, wherein information which has to be transmitted from one of the first units to two of the first units, is transmitted at least via a partial connection to one of the units by means of a single message and is then forwarded as two separate messages for transmitting to two of the first units.

5. The method according to claim 1, wherein the assignment of the respective sub-application and the determination of the communication connections through a service layer and the determination of the respective connection parameters and the configuration of the network through a communication layer are executed by exchanging information.

6. A device for distributing an application in a distributed system having a plurality of units, the application comprising multiple sub-applications and the plurality of units being able configured to communicate at least partially with one another via a network with communication connections, the device comprising:
 a processor, and
 computer instructions stored in non-transitory computer-readable media and executable by the processor to:
 determine connection parameters for communication connections between the units;
 for each sub-application, identify from the plurality of units at least one first unit configured to execute that sub-application;
 identify multiple different assignment configurations for assigning the sub-applications to selected first units configured to execute the respective sub-applications;
 for each of the multiple assignment configurations:
 identify a set of communication connections between the selected first units that have connection parameters that meet connection requirements defined by one or more of the sub-applications; and
 determine a number of units located along the identified set of communication connections; and
 select the assignment configuration having the smallest determined number of units located along the respective set of communication connections; and
 configure the network according to the selected assignment configuration.

7. The device according to claim 6, wherein the first means is further designed such that when assigning the respective sub-application it may further be ensured that the respective connection parameter of one of the communication connections for connecting two of the first units implements at least one respective requirement for exchanging information between the sub-applications assigned to two of the first units.

8. The device according to claim 6, wherein the fourth means is further designed such that at least one of the communication connections which is not used for exchanging information between two of the first units may be deactivated.

9. The device according to claim 6, wherein the device further comprises a fifth means which is designed such that information which is to be transmitted from one of the first units to two of the first units, may be transmitted at least via a partial connection to one of the units by means of a single message and then may be forwarded as two separate messages for transmitting to two of the first units.

10. The device according to claim 6, wherein the assignment of the respective sub-application and the determination of the communication connections through a service layer and the determination of the respective communication parameters and the configuration of the network through a communication layer may be executed for exchanging information.

* * * * *